(12) United States Patent
Miyamoto et al.

(10) Patent No.: US 11,611,094 B2
(45) Date of Patent: Mar. 21, 2023

(54) FUEL CELL SYSTEM AND METHOD OF CONTROLLING FUEL CELL SYSTEM

(71) Applicant: TOYOTA JIDOSHA KABUSHIKI KAISHA, Toyota (JP)

(72) Inventors: Yusuke Miyamoto, Nisshin (JP); Shigeki Hasegawa, Toyota (JP); Naoki Tomi, Nisshin (JP); Nobukazu Mizuno, Nagakute (JP); Masafumi Yamagata, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 152 days.

(21) Appl. No.: 16/269,902

(22) Filed: Feb. 7, 2019

(65) Prior Publication Data

US 2019/0260047 A1    Aug. 22, 2019

(30) Foreign Application Priority Data

Feb. 21, 2018    (JP) .............................. JP2018-028913

(51) Int. Cl.
*H01M 8/04746*    (2016.01)
*H01M 8/04082*    (2016.01)
*H01M 8/04111*    (2016.01)

(52) U.S. Cl.
CPC .... *H01M 8/04753* (2013.01); *H01M 8/04111* (2013.01); *H01M 8/04201* (2013.01); *H01M 8/04783* (2013.01)

(58) Field of Classification Search
CPC ......... H01M 8/04753; H01M 8/04111; H01M 8/04104; H01M 8/04201; H01M 8/04783; H01M 8/04082; H01M 8/04089; H01M 8/04; H01M 8/10
See application file for complete search history.

(56) References Cited

FOREIGN PATENT DOCUMENTS

| JP | 2009076243 | A | 4/2009 |
|---|---|---|---|
| JP | 2009123550 | A | 6/2009 |
| JP | 2010146749 | A | 7/2010 |
| JP | 2012094534 | A | 5/2012 |
| JP | 2017143020 | A | 8/2017 |
| JP | 2018181771 | A | 11/2018 |

OTHER PUBLICATIONS

English machine translation of Arisawa (JP 2009-123550) published Jun. 4, 2009.*
Iio et al., U.S. Appl. No. 16/247,764, Fuel Cell System and Method of Controlling Fuel Cell System, filed Jan. 15, 2019.

* cited by examiner

*Primary Examiner* — Christina Chern
(74) *Attorney, Agent, or Firm* — Dickinson Wright, PLLC

(57) ABSTRACT

A fuel cell system is equipped with a control unit that controls a rotational speed of the turbo compressor that supplies air to an air supply flow passage and an opening degree of at least one valve that adjusts a flow rate and a pressure of the air supplied to a fuel cell such that an operating point of the turbo compressor becomes a target operating point. The control unit sets the target operating point within an operating point range that is on the higher flow rate side than at least part of a first region where an amount of change in flow rate is larger than a predetermined value when a pressure ratio of the turbo compressor is changed by a predetermined amount at a same rotational speed, on a higher flow rate side than a surging region, when a predetermined condition is fulfilled.

1 Claim, 10 Drawing Sheets

FUEL CELL SYSTEM AND METHOD OF CONTROLLING FUEL CELL SYSTEM

INCORPORATION BY REFERENCE

The disclosure of Japanese Patent Application No. 2018-028913 filed on Feb. 21, 2018 including the specification, drawings and abstract is incorporated herein by reference in its entirety.

BACKGROUND

1. Technical Field

The disclosure relates to a fuel cell system and a method of controlling the fuel cell system.

2. Description of Related Art

With regard to a fuel cell system, it is described in, for example, Japanese Patent Application Publication No. 2009-123550 (JP 2009-123550 A) that a target operating point of a turbo compressor is set as an operating point that does not fall within a surging region when a required operating point of the turbo charger, which is determined by a flow rate of air and a pressure of air that are required by a fuel cell, falls within the surging region. "The surging region" means an operating point range where surging occurs in the turbo compressor.

SUMMARY

In the vicinity of the surging region of the turbo compressor, there is a region where the flow rate substantially changes even when the command value of the pressure is slightly changed with the rotational speed of the turbo compressor remaining unchanged. In this region, it is difficult to accurately control the actual operating point of the turbo compressor. Therefore, even when the target operating point is set outside the surging region, the actual operating point of the turbo compressor may unintentionally enter the surging region.

(1) A first aspect of the disclosure relates to a fuel cell system that is equipped with a fuel cell, an air supply flow passage through which air to be supplied to the fuel cell flows, a turbo compressor that supplies the air to the air supply flow passage, at least one valve that adjusts a flow rate and a pressure of the air that is supplied to the fuel cell via the air supply flow passage, and a control unit configured to set a target operating point that is defined based on a target flow rate and a target pressure ratio of the air which the turbo compressor is caused to discharge, and control a rotational speed of the turbo compressor and an opening degree of the at least one valve such that an operating point of the turbo compressor becomes the target operating point. A service region of the turbo compressor has a first region as a first operating point range where an amount of change in flow rate is larger than a predetermined value when a pressure ratio of the air discharged by the turbo compressor is changed by a predetermined amount at a same rotational speed, on a higher flow rate side than a surging region as a second operating point range where surging occurs in the turbo compressor. The control unit is configured to set the target operating point within a third operating point range that is on the higher flow rate side than at least part of the first region, when a predetermined condition is fulfilled, in setting the target operating point. According to the fuel cell system of this aspect, the higher flow rate side than the first region is set as the target operating point of the turbo compressor. Therefore, the target operating point can be set in such a manner as to avoid a region where the flow rate substantially changes due to a slight change in pressure ratio, and the operating point of the turbo compressor is restrained from unintentionally entering the surging region.

(2) In the fuel cell system according to the aforementioned aspect, the control unit may be configured to set the target operating point within the third operating point range that is on the higher flow rate side than at least part of the first region, when a condition that the target operating point is transferred to the operating point that is on a lower flow rate side and a lower pressure ratio side than a present target operating point is fulfilled, as the predetermined condition. According to the fuel cell system of this aspect, the higher flow rate side than the first region is set as the target operating point of the turbo compressor, in transferring the target operating point to the low flow rate side and the low pressure ratio side where the pressure ratio of the turbo compressor is likely to deflect upward from the target pressure ratio. Therefore, the operating point of the turbo compressor can be restrained from unintentionally entering the surging region due to upward deflection of the pressure ratio of the turbo compressor from the target pressure ratio.

(3) In the fuel cell system according to the aforementioned aspect, the control unit may be configured to set the target operating point within a range that is on the higher flow rate side than a second region as a fourth operating point range where a distance from the surging region is equal to or shorter than a predetermined distance, in transferring the target operating point to the operating point that is on the higher flow rate side than the present target operating point. According to the fuel cell system of this aspect, the target operating point is set within the range that is on the higher flow rate side than the second region where the predetermined distance is ensured from the surging region toward the high flow rate side, in transferring the target operating point toward the high flow rate side. Therefore, the turbo compressor can be restrained from being operated at an operating point in the vicinity of the surging region, and the operating point of the turbo compressor can be restrained from unintentionally entering the surging region.

(4) In the fuel cell system according to the aforementioned aspect, the control unit may be configured to reduce an amount of change in the target flow rate per unit time in the turbo compressor as a distance between the surging region and a service operating point that is defined based on a flow rate and a pressure ratio of the air discharged by the turbo compressor shortens, in transferring the target operating point to the operating point that is on the lower flow rate side than the present target operating point. According to the fuel cell system of this aspect, the amount of change in target flow rate per unit time in the turbo compressor is reduced as the distance between the service operating point of the turbo compressor and the surging region shortens, and an error is restrained from being produced between the flow rate of the air discharged by the turbo compressor and the target flow rate. Therefore, the operating point of the turbo compressor can be more reliably restrained from unintentionally entering the surging region.

(5) In the fuel cell system according to the aforementioned aspect, the at least one valve may include a pressure adjusting valve that is provided in an air discharge flow passage through which the air discharged from the fuel cell flows, and a bypass valve that is provided in a bypass flow passage to which the air in the air supply flow passage is charged without passing through the fuel cell, and the control unit may be configured to make an opening degree of the bypass valve larger than an opening degree corresponding to the target operating point, when a flow rate of the air supplied to the fuel cell is higher than a flow rate of the air required for electric power generation of the fuel cell and a pressure of the air supplied to the fuel cell is higher than a pressure of the air required for electric power generation of the fuel cell. According to the fuel cell system of this aspect, the opening degree of the bypass valve is increased when the flow rate of the air supplied to the fuel cell deflects upward from the target flow rate and the pressure of the air in the fuel cell deflects upward from the target pressure. Therefore, the operating point of the turbo compressor can be distanced from the surging region, while restraining the air from being supplied to the fuel cell at an excessive flow rate.

(6) In the fuel cell system according to the aforementioned aspect, the at least one valve may include a pressure adjusting valve that is provided in an air discharge flow passage through which the air discharged from the fuel cell flows, and a bypass valve that is provided in a bypass flow passage to which the air in the air supply flow passage is discharged without passing through the fuel cell, and the control unit may be configured to make an opening degree of at least one of the pressure adjusting valve and the bypass valve larger than an opening degree corresponding to the target operating point, as a distance between the surging region and a service operating point that is defined based on a flow rate and a pressure ratio of the air discharged by the turbo compressor shortens. According to the fuel cell system of this aspect, the opening degree of one of the bypass valve and the pressure adjusting valve is increased as the distance between the service operating point and the surging region shortens, so the service operating point is restrained from approaching the surging region. Therefore, the operating point of the turbo compressor can be more reliably restrained from unintentionally entering the surging region.

(7) A first aspect of the disclosure relates to a method of controlling a fuel cell system that is equipped with a turbo compressor that supplies air to a fuel cell, and at least one valve that adjusts a flow rate and a pressure of air supplied to the fuel cell. A service region of the turbo compressor has a first region as a first operating point range where an amount of change in flow rate is larger than a predetermined value when a pressure ratio of the air discharged by the turbo compressor is changed by a predetermined amount at a same rotational speed, on a higher flow rate side than a surging region as a second operating point range where surging occurs in the turbo compressor. The method comprises determining a target operating point as a target flow rate and a target pressure ratio of the air which the turbo compressor is caused to discharge is set within a third operating point range that is on the higher flow rate side than at least part of the first region, when a predetermined condition is fulfilled, and controlling a rotational speed of the turbo compressor and an opening degree of the valve such that an operating point of the turbo compressor becomes the target operating point.

The disclosure can also be realized in various aspects other than the fuel cell system. For example, the disclosure can be realized in aspects such as a fuel-cell-powered vehicle, a method of suppressing the occurrence of surging in a turbo compressor, and the like.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
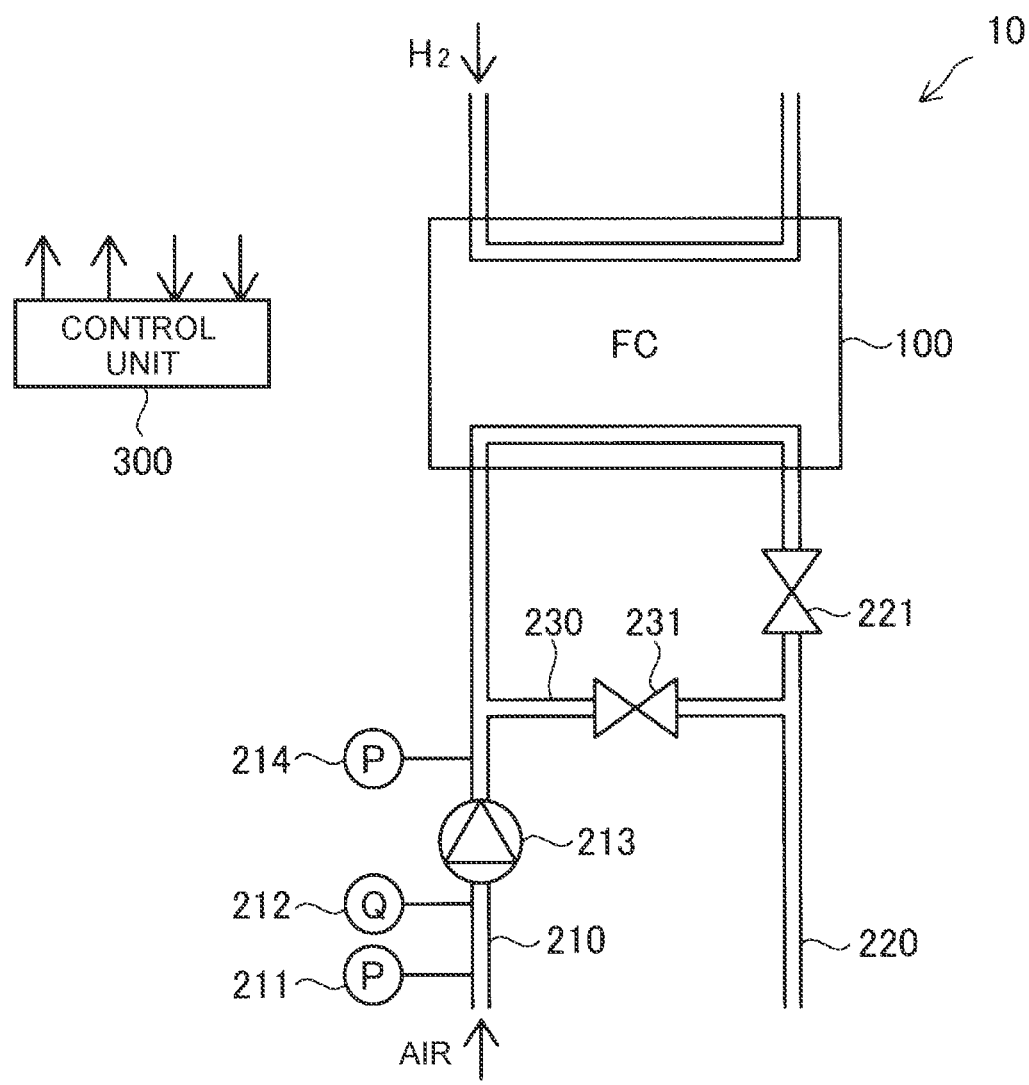
FIG. 1 is an illustrative view showing the overall configuration of a fuel cell system according to the first embodiment.

FIG. 1 is an illustrative view showing the overall configuration of a fuel cell system 10 according to the first embodiment. The fuel cell system 10 according to the present embodiment is mounted in, for example, a fuel-cell-powered vehicle, and is used as an electric power generation device for driving a motor for driving the fuel-cell-powered vehicle. The fuel cell system 10 may be used as a stationary electric power generation device. The fuel cell system 10 is equipped with a fuel cell 100, an air supply flow passage 210, a turbo compressor 213, an atmospheric pressure sensor 211, a flow rate sensor 212, a pressure sensor 214, an air discharge flow passage 220, a pressure adjusting valve 221, a bypass flow passage 230, a bypass valve 231, and a control unit 300.

The fuel cell 100 according to the present embodiment is a solid polymer fuel cell. The fuel cell 100 has a stack structure in which a plurality of cells are stacked on one another. Each of the cells is equipped with a membrane electrode assembly that has electrode catalytic layers on both surfaces of an electrolyte membrane, and a pair of separators that sandwich the membrane electrode assembly. Hydrogen gas as fuel gas is supplied to an anode side of the membrane electrode assembly, and air as oxidation gas is supplied to a cathode side of the membrane electrode assembly. Thus, each of the cells generates an electromotive force through an electrochemical reaction. The respective cells are connected in series to one another. Incidentally, a coolant flow passage through which a cooling medium for cooling the fuel cell 100 may be connected to the fuel cell 100.

The air supply flow passage 210 is a flow passage for supplying air to a cathode side of the fuel cell 100. The air supply flow passage 210 is provided, from an upstream side thereof, with the atmospheric pressure sensor 211, the flow rate sensor 212, the turbo compressor 213, and the pressure sensor 214.

The turbo compressor 213 is arranged in the air supply flow passage 210 on an upstream side thereof. The turbo compressor 213 of the present embodiment is a centrifugal compressor. The turbo compressor 213 is driven by a motor. The turbo compressor 213 sucks air in the atmosphere from a suction side thereof, pressurizes the air through rotation of an impeller provided in the turbo compressor 213, and supplies the pressurized air to the air supply flow passage 210 from a discharge side thereof. Incidentally, an axial flow compressor may be used as the turbo compressor 213.

The atmospheric pressure sensor 211 is provided in the air supply flow passage 210 upstream of the turbo compressor 213. The atmospheric pressure sensor 211 is a sensor for detecting an atmospheric pressure. Information on the atmospheric pressure acquired by the atmospheric pressure sensor 211 is transmitted to the control unit 300. The atmospheric pressure acquired by the atmospheric pressure sensor 211 is equivalent to an air pressure on the suction side of the turbo compressor 213.

The flow rate sensor 212 is provided in the air supply flow passage 210 upstream of the turbo compressor 213. The flow rate sensor 212 is a sensor for detecting an amount of air flowing into the air supply flow passage 210. Information on the amount of air acquired by the flow rate sensor 212 is transmitted to the control unit 300. The amount of air acquired by the flow rate sensor 212 is equivalent to an amount of air sucked into the turbo compressor 213.

The pressure sensor 214 is provided in the air supply flow passage 210 downstream of the turbo compressor 213. The pressure sensor 214 is a sensor for detecting an air pressure in the air supply flow passage 210. Information on the air pressure acquired by the pressure sensor 214 is transmitted to the control unit 300. The air pressure acquired by the pressure sensor 214 is equivalent to an air pressure on the discharge side of the turbo compressor 213.

The air discharge flow passage 220 is a flow passage for discharging air (cathode off-gas) from the cathode side of the fuel cell 100. The air discharge flow passage 220 is provided with the pressure adjusting valve 221.

The pressure adjusting valve 221 is a valve for adjusting the amount and pressure of air supplied to the fuel cell 100, by adjusting the opening degree of the air discharge flow passage 220. In the present embodiment, a butterfly valve is used as the pressure adjusting valve 221, and is configured as an electrically operated valve that is driven by a DC motor. The opening degree of the pressure adjusting valve 221 is controlled through the control of the driving of the DC motor by the control unit 300.

The bypass flow passage 230 is a flow passage for discharging the air in the air supply flow passage 210 without passing through the fuel cell 100. The bypass flow passage 230 of the present embodiment establishes communication between the air supply flow passage 210 between the turbo compressor 213 and the fuel cell 100, and the air discharge flow passage 220 downstream of the pressure adjusting valve 221, and serves to discharge air via the air discharge flow passage 220.

The bypass valve 231 is provided in the bypass flow passage 230. The bypass valve 231 is a valve for adjusting the amount and pressure of air supplied to the fuel cell 100, by adjusting the opening degree of the bypass flow passage 230. In the present embodiment, a butterfly valve is used as the bypass valve 231, and is configured as an electrically operated valve that is driven by a DC motor. The opening degree of the bypass valve 231 is controlled through the control of the driving of the DC motor by the control unit 300.

The control unit 300 is configured as a computer that is equipped with a CPU, a memory, and an interface circuit to which the respective components are connected. The CPU sets a target operating point that is defined based on a target flow rate and a target pressure ratio of air which the turbo compressor 213 is caused to discharge, and controls the rotational speed of the turbo compressor 213, the opening degree of the pressure adjusting valve 221, and the opening degree of the bypass valve 231 such that the target operating point is obtained, by executing a control program stored in the memory.

Figure 2:
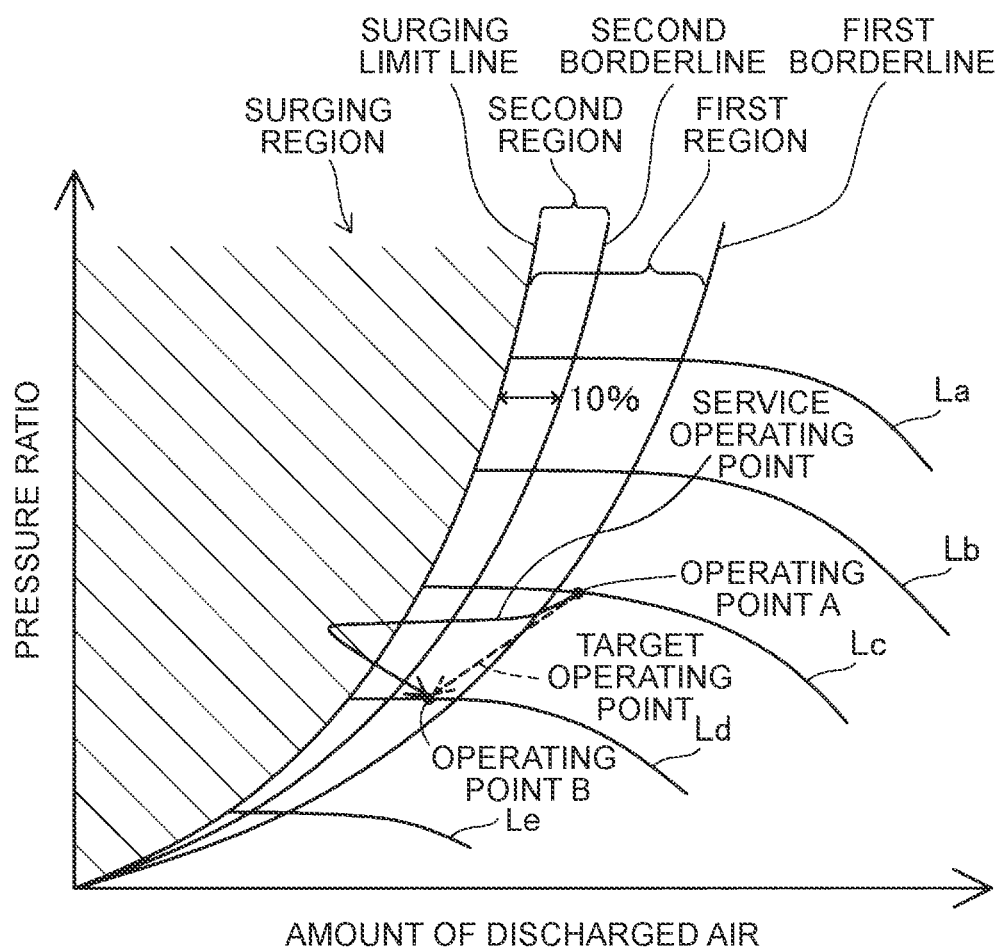
FIG. 2 is an illustrative view showing the performance characteristics of a turbo compressor.

FIG. 2 is an illustrative view showing the performance characteristics of the turbo compressor 213. The axis of abscissa represents an amount of air discharged from the turbo compressor 213. The axis of ordinate represents a pressure ratio of the turbo compressor 213. "The amount of discharged air" means an amount of air discharged from the turbo compressor 213 per unit time. "The pressure ratio" means a ratio of an air pressure on the discharge side of the turbo compressor 213 (a discharged air pressure) to an air pressure on the suction side of the turbo compressor 213 (a sucked air pressure). Incidentally, in the case where the fuel cell system 10 is operated under the atmospheric pressure, the sucked air pressure is equal to the atmospheric pressure, so the discharged air pressure may be used instead of the pressure ratio. In FIG. 2, five pressure curves La, Lb, Lc, Ld, and Le are shown in this sequence from above. The turbo compressor 213 is driven at the same rotational speed on the same pressure curve. The rotational speed of the turbo compressor 213 increases as the location of each of the pressure curves moves upward in FIG. 2. Each of the pressure curves is expressed as a line on which the rotational speed of the turbo compressor 213 remains the same, and hence is referred to also as "an iso-rotational speed curve". Besides, a point representing an operating state of the turbo compressor 213, which is determined by the amount of air discharged from the turbo compressor 213 and the pressure ratio thereof, is referred to as "an operating point".

When the amount of air discharged from the turbo compressor 213 is reduced, surging that makes it impossible to force-feed air occurs due to a turning stall or the like. In the present specification, an operating point range where surging occurs in the turbo compressor 213 is referred to as "a surging region". A line representing the limit of an operating point range that does not fall within the surging region is referred to as "a surging limit line". The surging limit line is obtained by reducing the amount of discharged air toward a low flow rate side along each of the pressure curves, finding a limit operating point where surging does not occur, repeating this process for the plurality of the pressure curves, and joining the limit operating points which have been found for the pressure curves respectively and at which surging does not occur.

The turbo compressor 213 has "a first region" on a higher flow rate side than the surging region. The first region is an operating point range where the amount of change in flow rate is larger than a predetermined value determined in the case where the pressure ratio of the turbo compressor 213 is changed by a predetermined amount at the same rotational speed. A line representing the limit of an operating point range that is on the higher flow rate side than the first region and that does not fall within the first region is referred to as "a first borderline". The first region is a range that is surrounded by the surging region and the first borderline. In the present embodiment, the first region is defined as an operating point range where the magnitude of the amount of change in flow rate in the case where the amount of change in pressure ratio is equal to 1 is larger than $\frac{1}{6} \times 10^5$ (NL/min). This value can be determined through a test conducted in advance. For example, when the rotational speed of the turbo compressor 213 continues to be reduced from an operating point A shown in FIG. 2, through a maximum deceleration torque applied to a drive shaft in operating the turbo compressor 213, it is tested whether a service operating point enters the surging region. The operating point A is an operating point in the first region in the case where the service operating point enters the surging region, and the operating point A is an operating point outside the first region in the case where the service operating point does not enter the surging region. The first region can be determined by conducting this test for a plurality of operating points.

The turbo compressor 213 has "a second region" on the higher flow rate side than the surging region. The second region is an operating point range within a predetermined distance from the surging region. A line representing the limit of an operating point range that is on the higher flow rate side than the second region and that does not fall within the second region is referred to as "a second borderline". The second region is a range that is surrounded by the surging region and the second borderline. In the present embodiment, "the predetermined distance" is a distance corresponding to 10% of the flow rate on the surging limit line. That is, the second borderline is a line obtained by moving the surging limit line toward the high flow rate side (the right side in FIG. 2) by the distance corresponding to 10% of the flow rate on the surging limit line. This distance is preferably set in consideration of the accuracy of the atmospheric pressure sensor 211, the flow rate sensor 212, and the pressure sensor 214, the responsiveness of the pressure adjusting valve 221 and the bypass valve 231, and the like.

In the present specification, the operating point of the turbo compressor 213 that is defined based on an amount and pressure of air required for electric power generation of the fuel cell 100 is referred to as "a required operating point". The required operating point is changed in accordance with an amount of air required for electric power generation of the fuel cell 100 (a required air amount) and a pressure of air required for electric power generation of the fuel cell 100 (a required air pressure). The control unit 300 sets a target operating point of the turbo compressor 213 in accordance with the required operating point, at control timings that are spaced apart from one another by, for example, one or more milliseconds. In the case where the fuel cell system 10 is mounted in the fuel-cell-powered vehicle, when a driver of the fuel-cell-powered vehicle reduces the pressure applied to an accelerator, the electric power that the fuel cell 100 is required to generate decreases. Due to the decrease in the electric power that the fuel cell 100 is required to generate, the required air amount and the required air pressure decrease, and the required operating point is changed.

In the present specification, an operating point that is defined based on a flow rate and a pressure ratio of air discharged by the turbo compressor 213 is referred to as "the service operating point". The service operating point is an operating point at which the turbo compressor 213 is actually operated based on the target operating point. In the present embodiment, the control unit 300 acquires the service operating point of the turbo compressor 213 through the use of the air amount acquired by the flow rate sensor 212 and the air pressure acquired by the atmospheric pressure sensor 211 and the pressure sensor 214.

FIG. 2 shows an exemplary locus of the service operating point at the time when the turbo compressor is operated based on the target operating point. In FIG. 2, a locus of the target operating point is indicated by a broken line, and the locus of the service operating point is indicated by a solid line. In the case where the required operating point is changed to an operating point B that is on a lower flow rate side and a lower pressure ratio side than the operating point A, which is an operating point in the vicinity of the first region, when the turbo compressor 213 is operated at the operating point A, the control unit 300 changes the target operating point from the operating point A to the operating point B. The control unit 300 controls the rotational speed of the turbo compressor 213, the opening degree of the pressure adjusting valve 221, and the opening degree of the bypass valve 231, based on the changed target operating point. In this case, the target operating point and the service operating point may deviate from each other as a result of response delays of the driving of the turbo compressor 213, the opening/closing of the pressure adjusting valve 221, and the opening/closing of the bypass valve 231. In the first region in particular, as shown in FIG. 2, when the pressure ratio slightly deflects upward from its target, the flow rate substantially deflects downward from its target. As a result, the service operating point may unintentionally enter the surging region. Thus, in the present embodiment, the service operating point is restrained from unintentionally entering the surging region, by performing a target operating point transfer process that will be described hereinafter.

Figure 3:
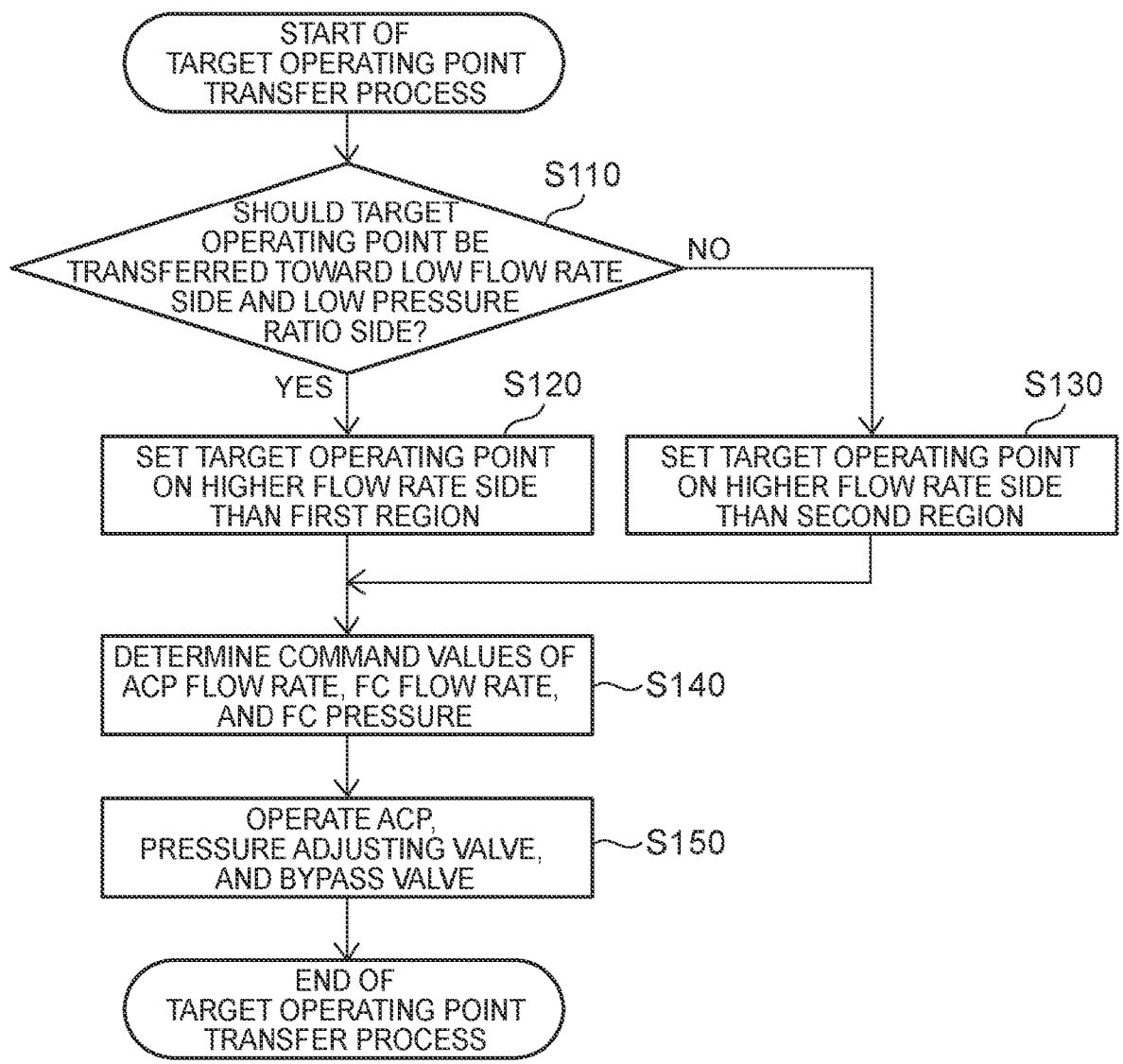
FIG. 3 is a flowchart showing the contents of a target operating point transfer process in the first embodiment.

FIG. 3 is a flowchart showing the contents of the target operating point transfer process in the first embodiment. This process is performed by the control unit 300 in setting the target operating point of the turbo compressor 213 in accordance with the required operating point. First of all, the control unit 300 determines whether or not the target operating point should be transferred, in accordance with the required operating point, to an operating point that is on the lower flow rate side and the lower pressure ratio side than a present target operating point (step S110).

If the target operating point should be transferred to the operating point that is on the lower flow rate side and the lower pressure ratio side than the present target operating point (YES in step S110), the control unit 300 sets the target operating point within a range that is on the higher flow rate side than the first region (step S120). In more concrete terms, when the required operating point is an operating point that is on the higher flow rate side than the first region, the control unit 300 sets the required operating point to the target operating point. When the required operating point is an operating point within the first region, the control unit 300 sets the target operating point as an operating point on the first borderline where the pressure ratio is the same as the pressure ratio at the required operating point. Subsequently, the control unit 300 sets a command value of an amount of air discharged from the turbo compressor 213 (an ACP flow rate) based on the target operating point set in step S120, and sets a command value of an amount of air supplied to the fuel cell 100 (an FC flow rate) and a command value of a pressure of air in the fuel cell 100 (an FC pressure) based on an amount and a pressure of air required for electric power generation of the fuel cell 100 (step S140). After that, the control unit 300 drives the turbo compressor 213 based on the set command values, manipulates the opening degree of at least one of the pressure adjusting valve 221 and the bypass valve 231 such that the air whose flow rate corresponds to the difference between the amount of air discharged from the turbo compressor 213 and the amount of air required for electric power generation of the fuel cell 100 flows through the bypass flow passage 230 (step S150), and ends this process. Incidentally, in step S150, the control unit 300 may increase the amount of air flowing through the bypass flow passage 230 by reducing the opening degree of the pressure adjusting valve 221, or may increase the amount of air flowing through the bypass flow passage 230 by increasing the opening degree of the bypass valve 231. The control unit 300 preferably adjusts the opening degree of the pressure adjusting valve 221 and the opening degree of the bypass valve 231 in a well-balanced manner, while ensuring the amount and pressure of air required for electric power generation of the fuel cell 100.

On the other hand, if the target opening degree should be transferred to an operating point that is not on the lower flow rate side or the lower pressure ratio side than the present target operating point (NO in step S110), the control unit 300 sets the target operating point within a range that is on the higher flow rate side than the second region (step S130). In more concrete terms, when the required operating point is an operating point that is on the higher flow rate side than the second region, the control unit 300 sets the required operating point to the target operating point. When the required operating point is an operating point within the second region, the control unit 300 sets the target operating point as an operating point on the second borderline where the pressure ratio is the same as the pressure ratio at the required operating point. Subsequently, the control unit 300 sets a command value of the amount of air discharged from the turbo compressor 213 (the ACP flow rate) based on the target operating point set in step S130, and sets a command value of the amount of air supplied to the fuel cell 100 (the FC flow rate) and a command value of the pressure of air in the fuel cell 100 (the FC pressure) based on the amount and pressure of air required for electric power generation of the fuel cell 100 (step S140). After that, the control unit 300 drives the turbo compressor 213 based on the set command values, manipulates the opening degree of at least one of the pressure adjusting valve 221 and the bypass valve 231 such that the air whose flow rate corresponds to the difference between the amount of air discharged from the turbo compressor 213 and the amount of air required for electric power generation of the fuel cell 100 flows through the bypass flow passage 230 (step S150), and ends this process.

Figure 4:
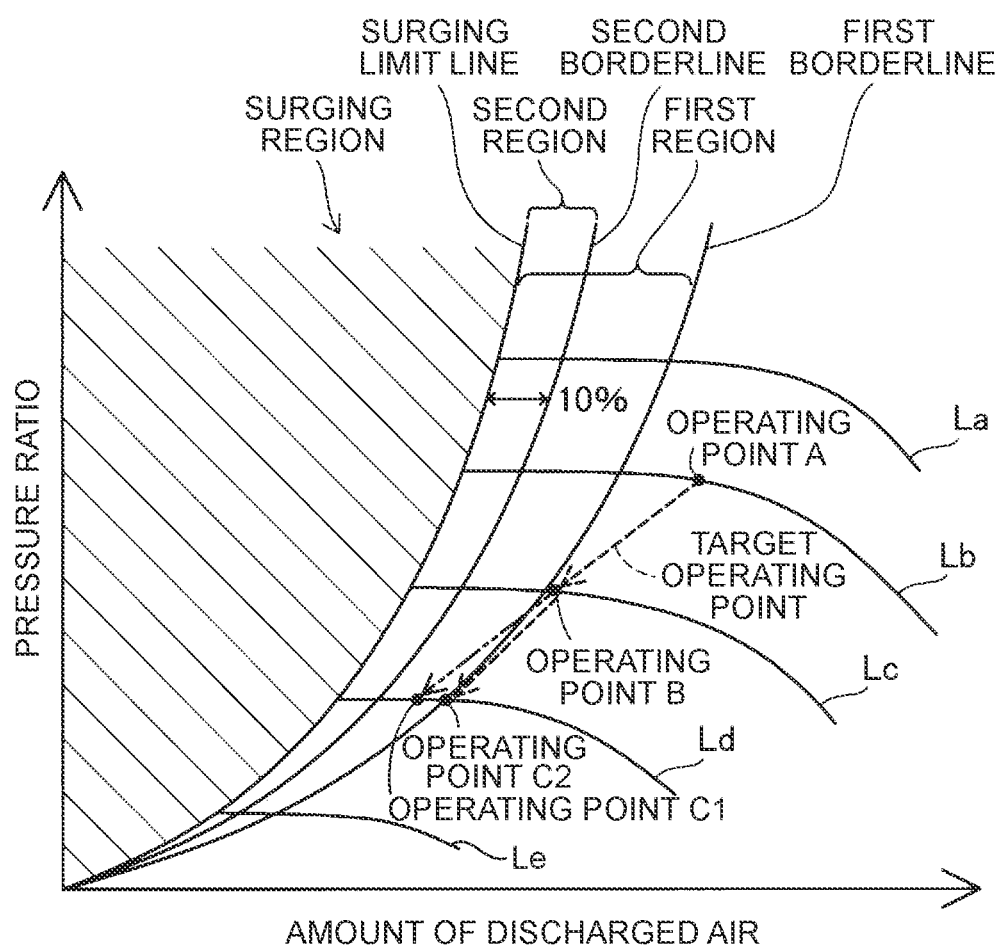
FIG. 4 is an illustrative view showing a locus of a target operating point in transferring the target operating point toward a low flow rate side and a low pressure ratio side.

FIG. 4 is an illustrative view showing an exemplary locus of the target operating point at the time when the required operating point is changed toward the low flow rate side and the low pressure ratio side. In FIG. 4, the locus of the target operating point in the case where the target operating point transfer process is performed is indicated by a broken line. Besides, the locus of the target operating point in the case where the target operating point transfer process is not performed is indicated by an alternate long and two short dashes line. When the required operating point is changed from the operating point A to the operating point B, which is on the lower flow rate side and the lower pressure ratio side than the operating point A, the control unit 300 sets the target operating point as the operating point B, because the operating point B is on the higher flow rate side than the first region. After that, when the required operating point is changed from the operating point B to an operating point C1, which is on the lower flow rate side and the lower pressure ratio side than the operating point B, the control unit 300 sets the target operating point as an operating point C2 that is on the higher flow rate side than the first region, because the operating point C1 is an operating point within the first region.

Figure 5:
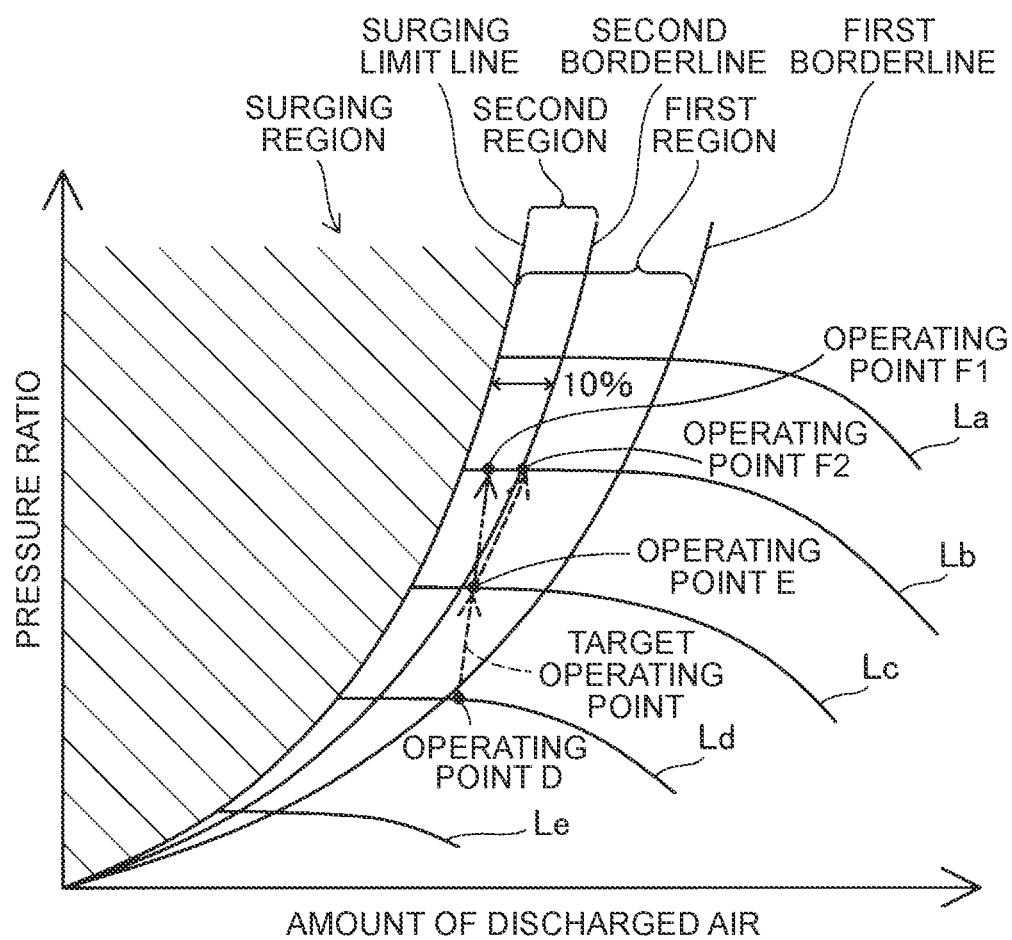
FIG. 5 is an illustrative view showing a locus of the target operating point in transferring the target operating point toward a high flow rate side.

FIG. 5 is an illustrative view showing an exemplary locus of the target operating point at the time when the required operating point is changed toward the high flow rate side. In FIG. 5, the locus of the target operating point in the case where the target operating point transfer process is performed is indicated by a broken line. Besides, the locus of the target operating point in the case where the target operating point transfer process is not performed is indicated by an alternate long and two short dashes line. When the required operating point is changed from an operating point D to an operating point E that is on the higher flow rate side and a higher pressure ratio side than the operating point D, the control unit 300 sets the target operating point as the operating point E, because the operating point E is on the higher flow rate side than the second region. After that, when the required operating point is changed from the operating point E to an operating point F1 that is on the higher flow rate side and the higher pressure ratio side than the operating point E, the control unit 300 sets the target operating point as an operating point F2 that is on the higher flow rate than the second region, because the operating point F1 is an operating point within the second region.

With the fuel cell system 10 according to the present embodiment described above, the control unit 300 sets the target operating point of the turbo compressor 213 on the higher flow rate side than the first region where the flow rate substantially changes due to a slight change in pressure ratio. Therefore, the target operating point can be set in such a manner as to avoid the first region where the flow rate substantially changes due to a slight change in pressure ratio, and the operating point of the turbo compressor 213 can be restrained from unintentionally entering the surging region.

Besides, in the present embodiment, the control unit 300 sets the target operating point of the turbo compressor 213 on the higher flow rate side than the first region, in transferring the target operating point toward the low flow rate side and the low pressure ratio side where the air ratio of the turbo compressor 213 is likely to deflect upward from the target pressure ratio. Therefore, the amount of air discharged from the turbo compressor 213 can be restrained from substantially deflecting downward from the target flow rate due to upward deflection of the pressure ratio of the turbo compressor 213 from the target pressure ratio, in the first region where the flow rate substantially changes due to a slight change in pressure ratio. As a result, the operating point of the turbo compressor 213 can be restrained from unintentionally entering the surging region.

Besides, in the present embodiment, the control unit 300 sets the target operating point within a range that is on the higher flow rate side than the second region where a predetermined distance (10%) is ensured from the surging region toward the high flow rate side, in transferring the target operating point toward the high flow rate side in such a manner as to move away from the surging region. Therefore, the turbo compressor 213 can be restrained from being operated at an operating point in the vicinity of the surging region, and the operating point of the turbo compressor 213 can be restrained from unintentionally entering the surging region.

B. Second Embodiment

In the second embodiment, the configuration of the fuel cell system 10 is the same as in the first embodiment (FIG.

1). The second embodiment is different from the first embodiment (FIG. 3) in that the control unit 300 reduces the amount of change in target flow rate per unit time in the turbo compressor 213 as the distance between the service operating point and the surging region shortens, in the case where the target operating point is transferred to an operating point that is on the lower flow rate side than the present target operating point.

Figure 6:
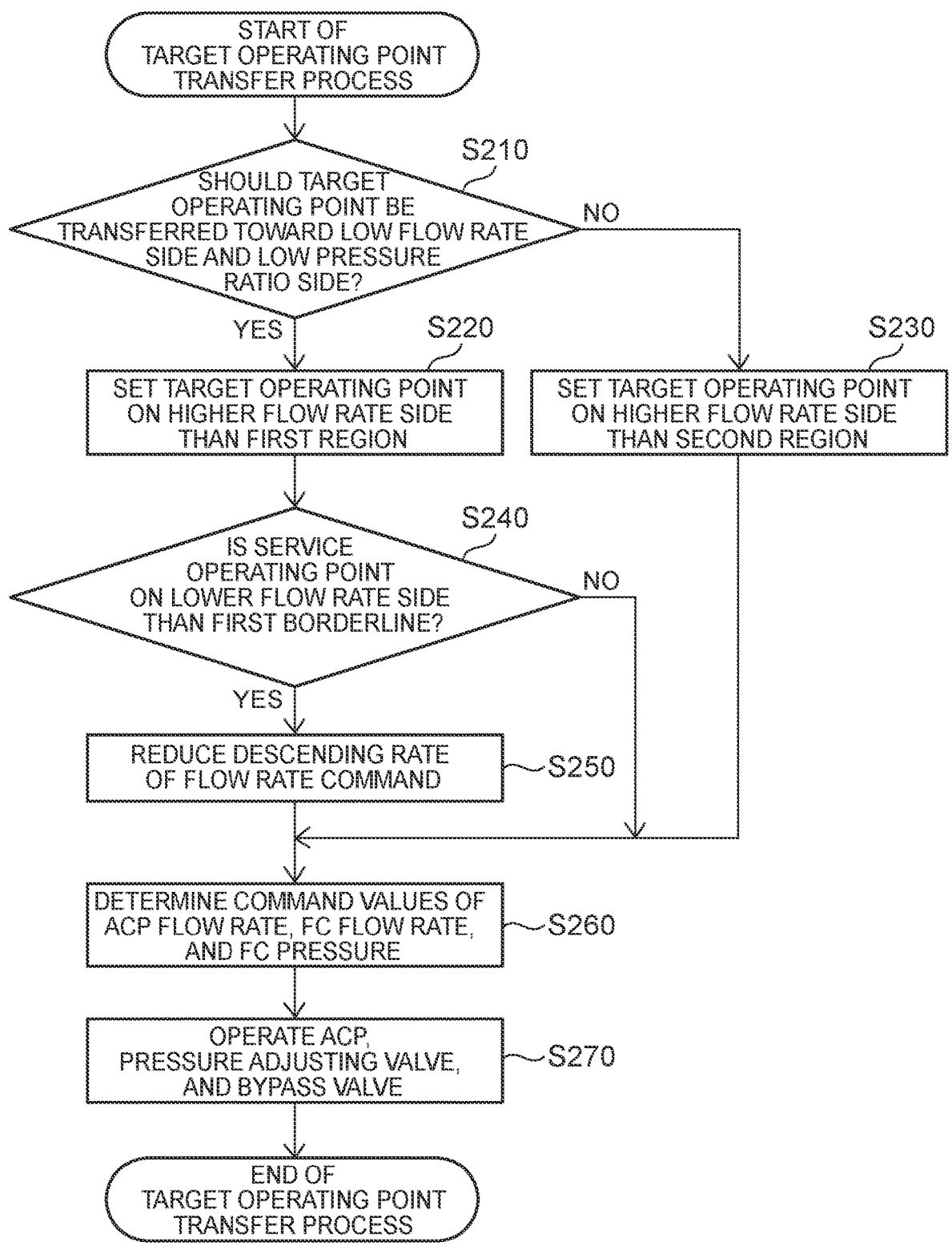
FIG. 6 is a flowchart showing the contents of a target operating point transfer process in the second embodiment.

FIG. 6 is a flowchart showing the contents of the target operating point transfer process in the second embodiment. This process is performed by the control unit 300 in setting the target operating point of the turbo compressor 213 in accordance with the required operating point. First of all, as is the case with the first embodiment, the control unit 300 determines whether or not the target operating point should be transferred to an operating point that is on the lower flow rate side and the lower pressure ratio side than the present target operating point (step S210). If the target operating point should be transferred to the operating point that is on the lower flow rate side and the lower pressure ratio side than the present target operating point (YES in step S210), the control unit 300 sets the target operating point within a range that is on the higher flow rate side than the first region (step S220). On the other hand, if the target operating point should be transferred to an operating point that is not on the lower flow rate side or the lower pressure ratio side than the present target operating point (NO in step S210), the control unit 300 sets the target operating point within a range that is on the higher flow rate side than the second region (step S230), and shifts the process to step S260.

After step S220, the control unit 300 determines whether or not the service operating point is on the lower flow rate side than the first borderline (step S240). If the service operating point is on the lower flow rate side than the first borderline (YES in step S240), the control unit 300 corrects the target operating point by multiplying the target flow rate by a correction gain (see FIG. 7) corresponding to the distance from the surging region, which will be described later (step S250). On the other hand, if the service operating point is not on the lower flow rate side than the first borderline (NO in step S240), the control unit 300 shifts the process to step S260.

Figure 7:
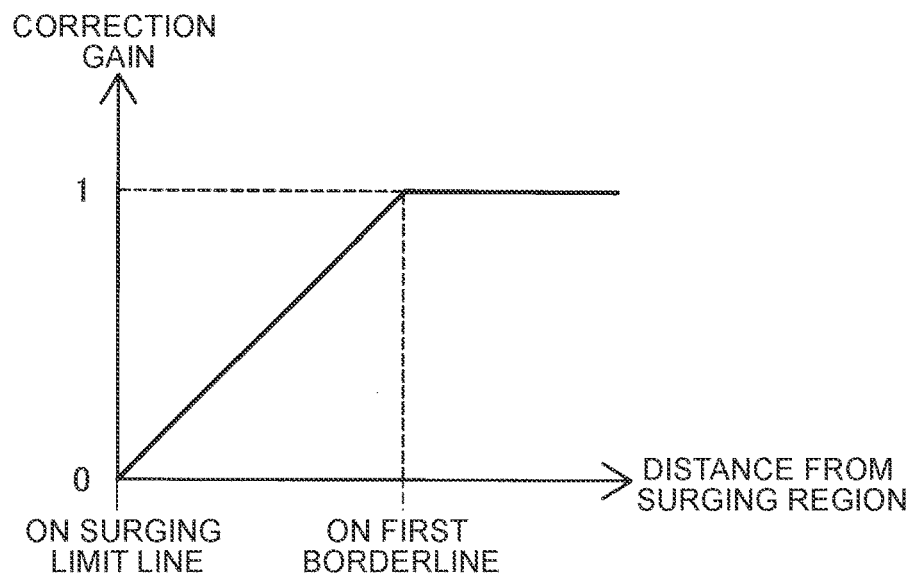
FIG. 7 is an illustrative view showing an amount of a correction gain corresponding to a distance from a surging region.

FIG. 7 is an illustrative view showing an exemplary amount of the correction gain corresponding to the distance from the surging region. The axis of abscissa represents the distance between the service operating point and the surging region. Incidentally, in the present embodiment, the difference between the amount of air at the service operating point and the amount of air at an operating point on the surging limit line where the pressure ratio is the same as at the service operating point is used as the distance between the service operating point and the surging region. The axis of ordinate represents the amount of the correction gain. The correction gain on the surging limit line is equal to 0. The correction gain on the first borderline is equal to 1. The correction gain linearly increases from the surging limit line toward the first borderline. The correction gain is equal to 1 on the higher flow rate side than the first borderline. That is, the amount of change in target flow rate per unit time in the turbo compressor 213 is reduced as the distance between the service operating point and the surging region shortens.

Returning to FIG. 6, the control unit 300 sets a command value of the amount of air discharged from the turbo compressor 213 (the ACP flow rate) based on the target operating point set in step S250 or step S230, and sets a command value of the amount of air supplied to the fuel cell 100 (the FC flow rate) and a command value of the pressure of air in the fuel cell 100 (the FC pressure) based on the amount and pressure of air required for electric power generation of the fuel cell 100 (step S260). The control unit 300 drives the turbo compressor 213 based on the set command values, manipulates the opening degree of at least one of the pressure adjusting valve 221 and the bypass valve 231 such that the air whose flow rate corresponds to the difference between the amount of air discharged from the turbo compressor 213 and the amount of air required for electric power generation of the fuel cell 100 flows through the bypass flow passage 230 (step S270), and ends this process.

Figure 8:
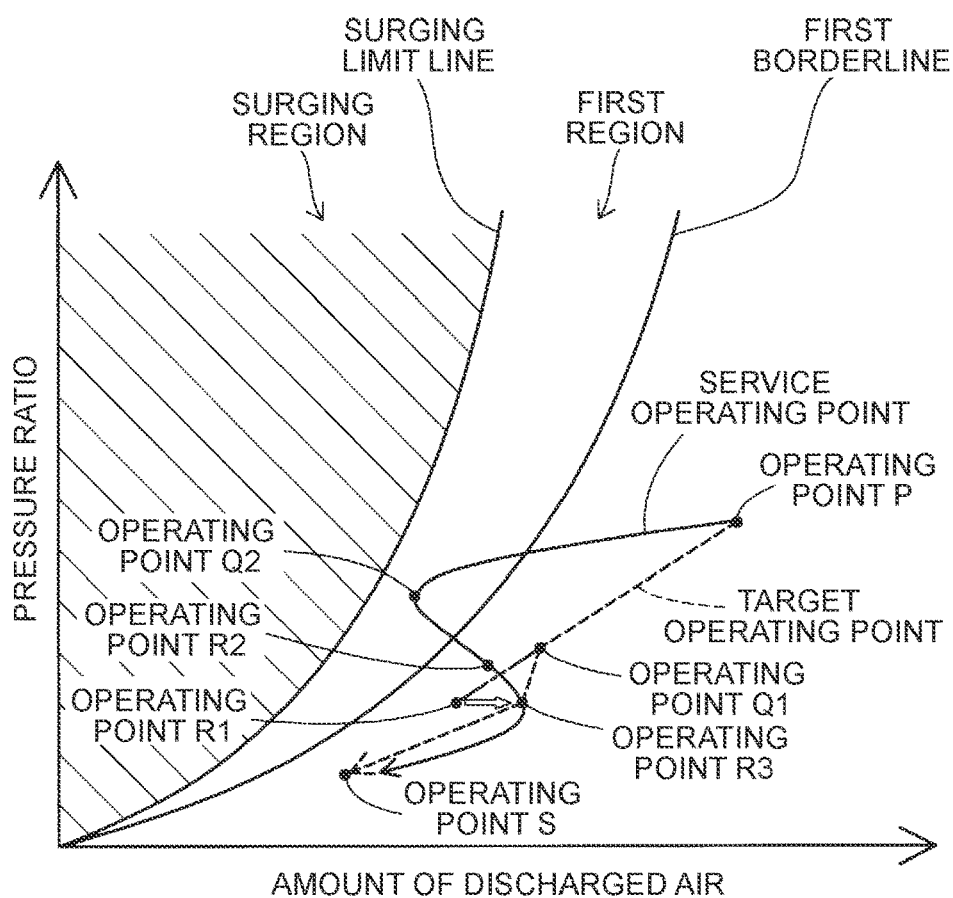
FIG. 8 is an illustrative view showing a post-correction locus of a target operating point and a post-correction locus of a service operating point.

FIG. 8 is an illustrative view showing an exemplary post-correction locus of the target operating point and an exemplary post-correction locus of the service operating point in the case where the operating point is transferred to an operating point that is on the low flow rate side and the low pressure ratio side. In FIG. 8, the locus of the target operating point is indicated by a broken line, and the locus of the service operating point is indicated by a solid line. Besides, the locus of the target operating point in the case where no correction is carried out is indicated by an alternate long and two short dashes line.

When the turbo compressor 213 is operated at an operating point P, the required operating point is changed from the operating point P to an operating point Q1. In this case, the operating point P as the service operating point at the current control timing falls within the range that is on the higher flow rate side than the first borderline, so the control unit 300 sets the operating point Q1 as the target operating point without correcting the target operating point, and controls the turbo compressor 213 based on the operating point Q1 as the target operating point.

At the subsequent control timing, the required operating point is changed from the operating point Q1 to an operating point R1. In this case, an operating point Q2 as the service operating point at the current control timing falls within a range that is on the lower flow rate side than the first borderline, so the control unit 300 corrects the target operating point from the operating point R1 to an operating point R3 by multiplying the target flow rate by the correction gain. Therefore, the amount of change in target flow rate is made smaller than in the case where the target operating point is not corrected (in the case where the target operating point is the operating point R1).

At the subsequent control timing, the required operating point is changed from the operating point R1 to an operating point S. In this case, an operating point R2 as the service operating point at the current control timing has returned to the range that is on the higher flow rate side than the first borderline, so the control unit 300 sets the operating point S as the target operating point without correcting the target operating point.

In the fuel cell system 10 according to the present embodiment described above, when the service operating point enters the range that is on the lower flow rate side than the first borderline, the amount of change in target flow rate per unit time in the turbo compressor 213 is reduced as the distance between the service operating point and the surging region shortens, and an error is restrained from being produced between the amount of air discharged from the turbo compressor 213 and the target flow rate. Therefore, even when the operating point of the turbo compressor 213 enters the first region, this operating point can be returned to the higher flow rate side than the first region before entering the surging region. As a result, the operating point of the turbo compressor 213 can be more reliably restrained from unintentionally entering the surging region.

Incidentally, in the present embodiment, the target flow rate is corrected when the service operating point is on the lower flow rate side than the first borderline. However, the target flow rate may be corrected when the service operating point is on the lower flow rate side than the second borderline, or when the distance between the service operating point and the surging region becomes equal to or shorter than a predetermined distance set in advance.

C. Third Embodiment

In the third embodiment, the configuration of the fuel cell system 10 is the same as in the first embodiment (FIG. 1). The third embodiment is different from the first embodiment (FIG. 3) in that the control unit 300 makes the opening degree of the bypass valve 231 larger than an opening degree corresponding to the target operating point when the amount of air supplied to the fuel cell 100 is larger than the amount of air required for electric power generation of the fuel cell 100 and the pressure of air supplied to the fuel cell 100 is higher than the pressure of air required for electric power generation of the fuel cell 100.

Figure 9:
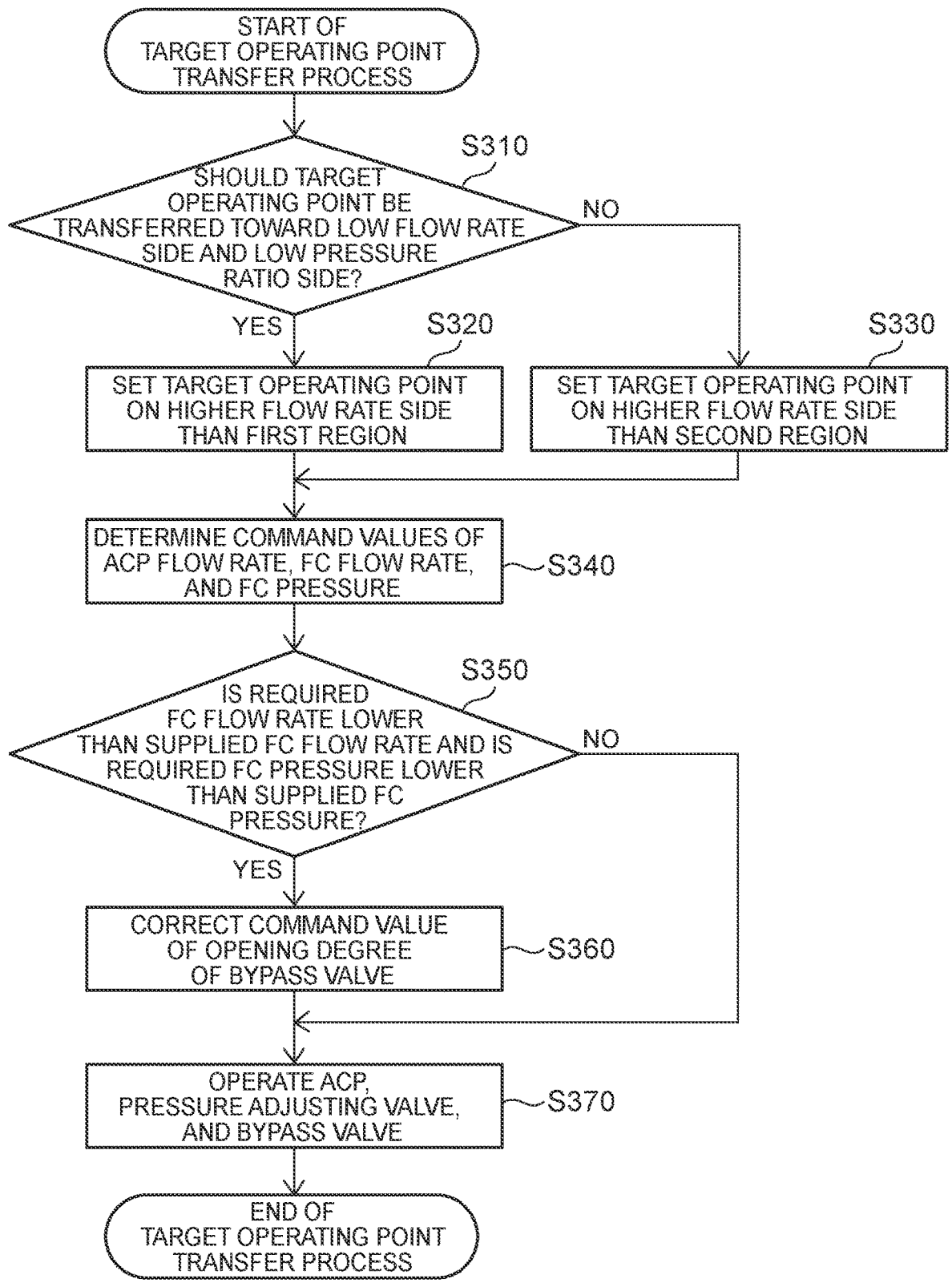
FIG. 9 is a flowchart showing the contents of a target operating point transfer process in the third embodiment.

FIG. 9 is a flowchart showing the contents of the target operating point transfer process in the third embodiment. This process is performed by the control unit 300 in setting the target operating point of the turbo compressor 213 in accordance with the required operating point. First of all, as is the case with the first embodiment (FIG. 3), the control unit 300 determines whether or not the target operating point should be transferred to an operating point that is on the lower flow rate and the lower pressure ratio side than the present target operating point (step S310). If the target operating point should be transferred to the operating point that is on the lower flow rate side and the lower pressure ratio side than the present target operating point (YES in step S310), the control unit 300 sets the target operating point within a range that is on the higher flow rate side than the first region (step S320). On the other hand, if the target operating point should be transferred to an operating point that is not on the lower flow rate side or the lower pressure ratio side than the present target operating point (NO in step S310), the control unit 300 sets the target operating point within a range that is on the higher flow rate side than the second region (step S330). After the processing of step S320 or step S330 is performed, the control unit 300 sets command values of the amount of air discharged from the turbo compressor 213 (the ACP flow rate), the amount of air supplied to the fuel cell 100 (the FC flow rate), and the pressure of air in the fuel cell 100 (the FC pressure) based on the set target operating point (step S340).

Subsequently, the control unit 300 acquires the amount of air supplied to the fuel cell 100 and the pressure of air in the fuel cell 100, and determines whether or not the amount of air supplied to the fuel cell 100 is larger than the amount of air required for electric power generation of the fuel cell 100 and the pressure of air supplied to the fuel cell 100 is higher than the pressure of air required for electric power generation of the fuel cell 100 (step S350). In the present embodiment, the air pressure acquired by the pressure sensor 214 is used as the pressure of air supplied to the fuel cell 100. Besides, the amount of air supplied to the fuel cell 100 is estimated through calculation, by acquiring flow passage resistances of the air supply flow passage 210, the air discharge flow passage 220, and the bypass flow passage 230 through a test conducted in advance or the like, and using the air amount acquired by the flow rate sensor 212 and the flow passage resistances of the respective flow passages.

If the amount of air supplied to the fuel cell 100 is larger than the amount of air required for electric power generation of the fuel cell 100 and the pressure of air supplied to the fuel cell 100 is higher than the pressure of air required for electric power generation of the fuel cell 100 (YES in step S350), the control unit 300 makes the opening degree of the bypass valve 231 larger than an opening degree corresponding to the target operating point (step S360). In more concrete terms, the control unit 300 corrects the command value of the opening degree of the bypass valve 231 such that the air whose flow rate corresponds to the difference between the amount of air discharged from the turbo compressor 213 and the amount of air required for electric power generation of the fuel cell 100 flows through the bypass flow passage 230. In this case, the command value corrected by the control unit 300 may be a command value of the torque for driving the bypass valve 231 or a command value of the current of a motor for driving the bypass valve 231, instead of the command value of the opening degree of the bypass valve 231. On the other hand, if the amount of air supplied to the fuel cell 100 is smaller than the amount of air required for electric power generation of the fuel cell 100 or the pressure of air supplied to the fuel cell 100 is lower than the pressure of air required for electric power generation of the fuel cell 100 (NO in step S350), the control unit 300 shifts the process to step S370 without correcting the command value of the opening degree of the bypass valve 231.

After that, the control unit 300 manipulates the driving of the turbo compressor 213 and the opening degree of at least one of the pressure adjusting valve 221 and the bypass valve 231 based on the set command values (step S370), and ends this process.

In the fuel cell system 10 according to the present embodiment described above, when the amount of air supplied to the fuel cell 100 deflects upward from the target flow rate and the pressure of air in the fuel cell 100 deflects upward from the target pressure, the opening degree of the bypass valve 231 is increased such that the air whose flow rate corresponds to upward deflection is discharged from the bypass flow passage 230 without passing through the fuel cell 100. Therefore, the operating point of the turbo compressor 213 can be distanced from the surging region, while restraining air from being supplied to the fuel cell 100 at an excessive flow rate.

Incidentally, although the present embodiment has been described as being combined with the first embodiment, it is also appropriate to combine the present embodiment with the second embodiment. In this case, the control unit 300 performs the processing of steps S350 to S370 in FIG. 9 after step S260 in FIG. 6.

D. Fourth Embodiment

In the fourth embodiment, the configuration of the fuel cell system 10 is the same as in the first embodiment (FIG. 1). The fourth embodiment is different from the first embodiment (FIG. 3) in that the control unit 300 increases the opening degree of at least one of the pressure adjusting valve 221 and the bypass valve 231 above the opening degree corresponding to the target opening degree as the distance between the service operating point of the turbo compressor 213 and the surging region shortens.

Figure 10:
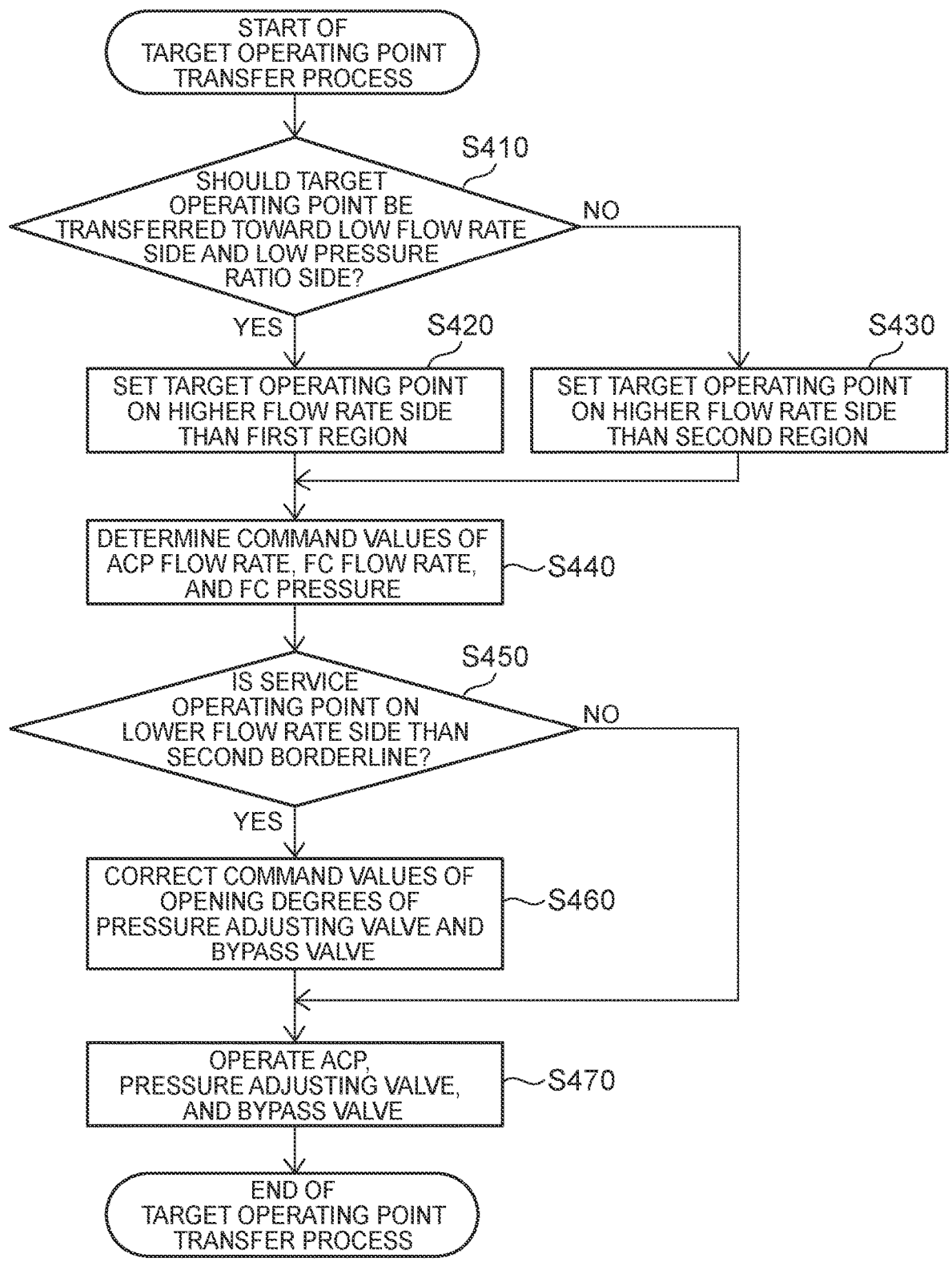
FIG. 10 is a flowchart showing the contents of a target operating point transfer process in the fourth embodiment.

FIG. 10 is a flowchart showing the contents of the target operating point transfer process in the fourth embodiment.

This process is performed by the control unit 300 in setting the target operating point of the turbo compressor 213 in accordance with the required operating point. First of all, as is the case with the first embodiment (FIG. 3), the control unit 300 determines whether or not the target operating point should be transferred to an operating point that is on the lower flow rate side and the lower pressure ratio side than the present target operating point (step S410). If the target operating point should be transferred to the operating point that is on the lower flow rate side and the lower pressure ratio side than the present target operating point (YES in step S410), the control unit 300 sets the target operating point within a range that is on the higher flow rate side than the first region (step S420). On the other hand, if the target operating point should be transferred to an operating point that is not on the lower flow rate side or the lower pressure ratio side than the present target operating point (NO in step S410), the control unit 300 sets the target operating point within a range that is on the higher flow rate side than the second region (step S430). After the processing of step S420 or step S430 is performed, the control unit 300 sets command values of the amount of air discharged from the turbo compressor 213 (the ACP flow rate), the amount of air supplied to the fuel cell 100 (the FC flow rate), and the pressure of air in the fuel cell 100 (the FC pressure) based on the set target operating point (step S440).

Subsequently, the control unit 300 acquires the service operating point, and determines whether or not the service operating point is on the lower flow rate side than the second borderline (step S450). If the service operating point is on the lower flow rate side than the second borderline (YES in step S450), the control unit 300 increases the opening degree of at least one of the pressure adjusting valve 221 and the bypass valve 231 (step S460). In more concrete terms, the control unit 300 corrects the command value of the opening degree of at least one of the pressure adjusting valve 221 and the bypass valve 231, through multiplication by a post-variation proportional gain (see FIG. 11) corresponding to the distance from the surging region, which will be described later. In this case, the command value corrected by the control unit 300 may be a command value of the torque for driving the bypass valve 231 or a command value of the current of the motor for driving the bypass valve 231, instead of the command value of the opening degree of the bypass valve 231. On the other hand, if the service operating point is not on the lower flow rate side than the second borderline (NO in step S450), the control unit 300 shifts the process to step S470 without correcting the command value of the opening degree of each of the pressure adjusting valve 221 and the bypass valve 231.

Figure 11:
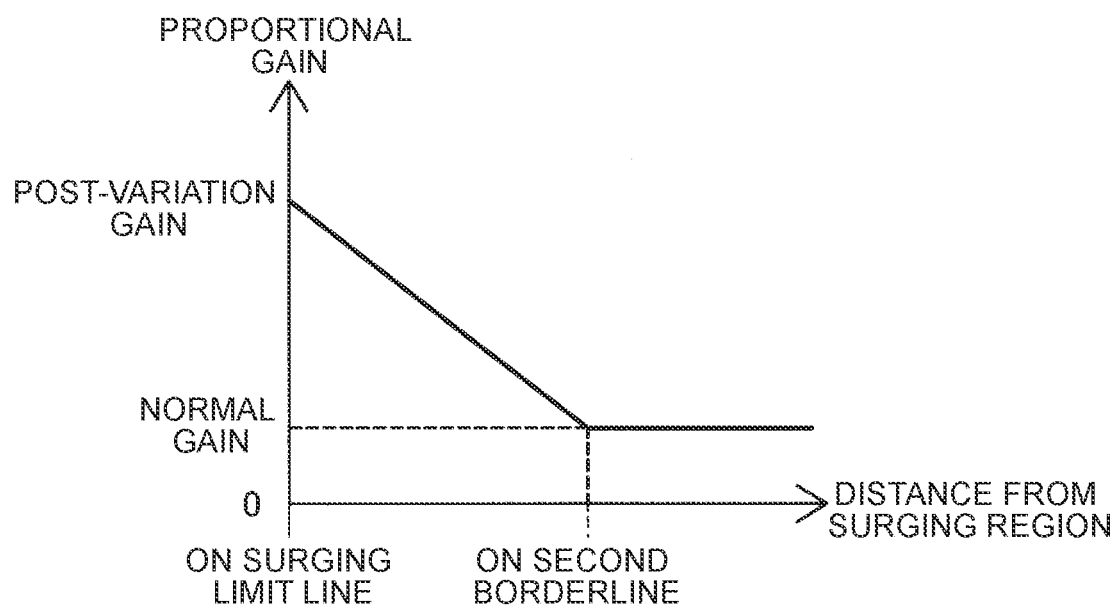
FIG. 11 is an illustrative view showing an amount of a proportional gain corresponding to a distance from a surging region.

FIG. 11 is an illustrative view showing the amount of the proportional gain corresponding to the distance from the surging region. The axis of abscissa represents the distance from the surging region. Incidentally, in the present embodiment, the difference between the amount of air at the service operating point and the amount of air at the operating point on the surging limit line with the same pressure ratio as at the service operating point is used as the distance between the service operating point and the surging region. The axis of ordinate represents the amount of the proportional gain. On the surging limit line, the amount of the proportional gain is that of the post-variation proportional gain, whose amount is larger than that of a normal gain that is used in the case where no correction is carried out. The amount of the proportional gain linearly decreases from the surging limit line toward the second borderline, and the amount of the proportional gain is equal to that of the normal gain on the second borderline. When the opening degree of the pressure adjusting valve 221 is increased by multiplying the command value of the opening degree thereof by the post-variation proportional gain, the pressure of air in the fuel cell 100 falls, and the pressure ratio of the turbo compressor 213 falls. Besides, the amount of air discharged from the turbo compressor 213 increases, and the amount of air supplied to the fuel cell 100 increases. On the other hand, when the opening degree of the bypass valve 231 is increased by multiplying the command value of the opening degree thereof by the post-variation proportional gain, the pressure ratio of the turbo compressor 213 falls. Besides, the amount of air discharged from the turbo compressor 213 increases, but the amount of air supplied to the fuel cell 100 decreases. Accordingly, it is preferable to adjust the opening degree of the pressure adjusting valve 221 and the opening degree of the bypass valve 231 in a well-balanced manner.

Returning to FIG. 10, the control unit 300 manipulates the driving of the turbo compressor 213 and the opening degree of at least one of the pressure adjusting valve 221 and the bypass valve 231 based on the set command values (step S470), and ends this process.

In the fuel cell system 10 according to the present embodiment described above, the opening degree of one of the bypass valve 231 and the pressure adjusting valve 221 is increased as the distance between the service operating point and the surging region shortens. Thus, the amount of air discharged from the turbo compressor 213 is increased, the pressure ratio of the turbo compressor 213 is lowered, and the service operating point is restrained from approaching the surging region. Therefore, the operating point of the turbo compressor 213 can be more reliably restrained from unintentionally entering the surging region.

Incidentally, although the present embodiment has been described as being combined with the first embodiment, it is also appropriate to combine the present embodiment with the second embodiment. In this case, the control unit 300 performs the processing of steps S450 to S470 in FIG. 10, after step S260 in FIG. 6.

The present embodiment may be combined with the second embodiment and further with the third embodiment. In this case, the control unit 300 performs the processing of steps S350 and S360 in FIG. 9 after step S260 in FIG. 6, and then performs the processing of steps S450 to S470 in FIG. 10.

E. Fifth Embodiment

In the fuel cell system 10 according to each of the above-mentioned embodiments, the control unit 300 sets the target operating point within the range that is on the higher flow rate side than the first region, when the predetermined condition that the target operating point should be transferred to the operating point that is on the lower flow rate side and the lower pressure ratio side than the present target operating point is fulfilled (YES in step S110 in FIG. 3). In contrast, the control unit 300 may set the target operating point within the range that is on the higher flow rate side than the first region, constantly, that is, when a condition that the target operating point should be transferred from the present target operating point is fulfilled.

F. Sixth Embodiment

In the fuel cell system 10 according to each of the above-mentioned embodiments, the control unit 300 sets the target operating point within the range that is on the higher flow rate side than the first region (step S120). That is, the control unit 300 sets the target operating point within the operating point range that is on the higher flow rate side than the entirety of the first region. In contrast, the control unit 300 may set the target operating point within an operating point range that is on the higher flow rate side than at least part of the first region. For example, the control unit 300 may set the target operating point within an operating point range that is on the higher flow rate side than a line obtained by offsetting the first borderline toward the low flow rate side by a predetermined amount. On the higher pressure ratio side than a predetermined pressure ratio at which there is a long distance between the first borderline and the surging region, the control unit 300 may set the target operating point within the first region in the vicinity of the first borderline. That is, the range of the operating point that can be set as the target operating point by the control unit 300 preferably does not include the first region, but may include part of the first region.

G. Seventh Embodiment

In the fuel cell system 10 according to each of the above-mentioned embodiments, if the target operating point should be transferred to the operating point that is on the lower flow rate side and the lower pressure ratio side than the present target operating point (YES in step S110 in FIG. 3) and the required operating point is an operating point within the first region, the control unit 300 sets the target operating point as an operating point on the first borderline where the pressure ratio is the same as at the required operating point. In contrast, the control unit 300 may set the target operating point as an operating point at which the pressure ratio is the same as at the required operating point and the amount of discharged air is larger than on the first borderline. Besides, if the target operating point should be transferred to the operating point that is not on the lower flow rate side or the lower pressure ratio side than the present target operating point (NO in step S110 in FIG. 3) and the required operating point is an operating point within the second region, the control unit 300 sets the target operating point as an operating point on the second borderline where the pressure ratio is the same as at the required operating point. In contrast, the control unit 300 may set the target operating point as an operating point at which the pressure ratio is the same as at the required operating point and the amount of discharged air is larger than on the second borderline.

H. Eighth Embodiment

In the fuel cell system 10 according to each of the above-mentioned embodiments, the control unit 300 uses the difference between the amount of air at the service operating point and the amount of air at the operating point on the surging limit line with the same pressure ratio as at the service operating point, as the distance between the service operating point and the surging region. In contrast, the control unit 300 may use the difference between the pressure ratio at the operating point on the surging limit line with the same amount of air as at the service operating point and the pressure ratio at the service operating point, the distance between the service operating point and the operating point on the surging limit line that is closest to the service operating point, or the distance on the iso-rotational speed curve, as the distance between the service operating point and the surging region. Besides, the service operating point may not be acquired through the use of actually measured values acquired by the sensors at the current control timing, but may be estimated through the use of the target operating point set by the control unit 300 at the last control timing.

I. Ninth Embodiment

In the fuel cell system 10 according to each of the above-mentioned embodiments, the bypass flow passage 230 establishes communication between the air supply flow passage 210 between the turbo compressor 213 and the fuel cell 100, and the air discharge flow passage 220 downstream of the pressure adjusting valve 221. In contrast, the bypass flow passage 230 may communicate with the atmosphere without passing through the air discharge flow passage 220.

J. Tenth Embodiment

In each of the above-mentioned embodiments, the fuel cell system 10 may not be equipped with the atmospheric pressure sensor 211. In this case, the control unit 300 uses a fixed value (e.g., a standard atmospheric pressure) instead of the atmospheric pressure acquired by the atmospheric pressure sensor 211, as the suction air pressure in calculating the pressure ratio.

K. Eleventh Embodiment

In the fuel cell system 10 according to each of the above-mentioned embodiments, the flow rate sensor 212 is provided in the air supply flow passage 210 upstream of the turbo compressor 213, and the amount of air supplied to the fuel cell 100 is estimated through calculation through the use of the amount of air acquired by the flow rate sensor 212 and the flow passage resistances of the respective flow passages. In contrast, the flow rate sensor 212 may be provided in the air supply flow passage 210 downstream of the turbo compressor 213 and upstream of that portion of the air supply flow passage 210 which is connected to the bypass flow passage 230. Besides, a second flow rate sensor may be provided between the fuel cell 100 and that portion of the air supply flow passage 210 which is connected to the bypass flow passage 230, and the amount of air acquired by the second flow rate sensor may be used as the amount of air supplied to the fuel cell 100. The second flow sensor may be provided in the bypass flow passage 230, and the amount of air supplied to the fuel cell 100 may be acquired from the difference between the amount of air acquired by the flow rate sensor 212 and the amount of air acquired by the second flow rate sensor.

The disclosure is not limited to the above-mentioned embodiments, but can be realized in various configurations within such a range as not to depart from the gist thereof. For example, the technical features in the embodiments corresponding to the technical features in the respective aspects mentioned in the section of SUMMARY can be appropriately replaced or combined with one another to partially or entirely solve the above-mentioned problem or to partially or entirely achieve the above-mentioned effect. Besides, the technical features can be appropriately deleted unless they are described as being indispensable in the present specification.

What is claimed is:
1. A fuel cell system comprising:
a fuel cell;

an air supply flow passage through which air to be supplied to the fuel cell flows;
a turbo compressor that supplies the air to the air supply flow passage;
at least one valve that adjusts a flow rate and a pressure of the air that is supplied to the fuel cell via the air supply flow passage; and
a control unit programmed to set a target operating point that is defined based on a target flow rate and a target pressure ratio of the air which the turbo compressor is caused to discharge, and control a rotational speed of the turbo compressor and an opening degree of the at least one valve such that an actual operating point of the turbo compressor becomes the target operating point, wherein
a service region of the turbo compressor has
a surging region defined as a range of operating points with a combination of flow rate and pressure ratio that results in the turbo compressor surging, with an upper limit of the surging region defining a surging limit line, and
a first region defined as a range of operating points having flow rates higher than the surging limit line, and below a first borderline that defines operating points with flow rates below which, during transition from a first turbo compressor speed to a lower turbo compressor speed, the actual operating point enters the surging region, and
the control unit is programmed, when a current target operating point having a flow rate higher than the first region is required to be shifted to a new target operating point having a lower flow rate and a lower pressure ratio, to determine whether the new target operating point is a point having a higher flow rate than the first region, and (i) to set the current target operating point to the new target operating point if the new target operating point is an operating point having a flow rate higher than the first region, and (ii) to change the target operating point to an operating point having a flow rate higher than the first region if the new target operating point is in the first region.

* * * * *